O. O. STORLE.
KNUCKLE JOINT FOR TRANSMISSION SHAFTS.
APPLICATION FILED JAN. 11, 1918.

1,317,054.

Patented Sept. 23, 1919.

Ole O. Storle
INVENTOR

UNITED STATES PATENT OFFICE.

OLE O. STORLE, OF TACOMA, WASHINGTON.

KNUCKLE-JOINT FOR TRANSMISSION-SHAFTS.

1,317,054. Specification of Letters Patent. Patented Sept. 23, 1919.

Application filed January 11, 1918. Serial No. 211,374.

*To all whom it may concern:*

Be it known that I, OLE O. STORLE, a citizen of the United States, residing at Tacoma, in the county of Pierce and State of Washington, have invented new and useful Improvements in Knuckle-Joints for Transmission-Shafts, of which the following is a specification.

My invention relates to knuckle joints for transmission shafts for automobiles and other places where needed.

The objects of my invention are: first, to obtain a knuckle joint with transmission pins revolving on a common center thus securing an easy movement and a durable joint; second, to provide a knuckle joint that is self lubricating and dirt proof; and third, to make an open knuckle joint having a smooth round ring with pins flush with its perimeter.

I attain these objects by means of the mechanism illustrated in the accompanying drawing in which:—

Similar numerals refer to similar parts in the several views.

Figure 5:
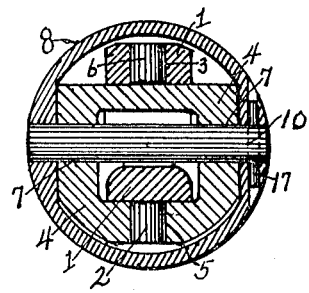
Fig. 5 is vertical cross section of Fig. 3 on the line 5—5, and shows the construction of the journal ring or block.
Figure 2:
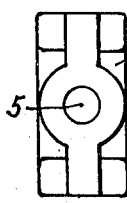
Fig. 2 is a bottom view of the ring complete.

The adjacent ends of the transmission shaft S are coupled together by a knuckle-joint formed as follows: One end of the shaft is formed with a yoke or fork 1 the oppositely disposed members of which are formed, one with a socket 3 and the other with a journal or stem 2. Interlacing or interlocking with the yoke or fork is a block or ring 4 having on one face a stem or journal 6 to enter the socket 3 of the fork, and its opposite face formed with a socket 5 to receive the stem or journal 2 of the fork, and the opposite sides of the block or ring are formed with registering holes 7 to receive a coupling pin 10. The adjacent end of the other part of the shaft S is formed with a yoke or fork 8 which may be of globular or semi-spherical form as illustrated in Figs. 3, 4, and 5 and will be connected to the fork and ring of the other part of the shaft by the coupling pin 10, the ends of which will pass through the yoke or fork 8 as illustrated in Figs. 4 and 5 and be secured by a pin 17.

Figure 3:
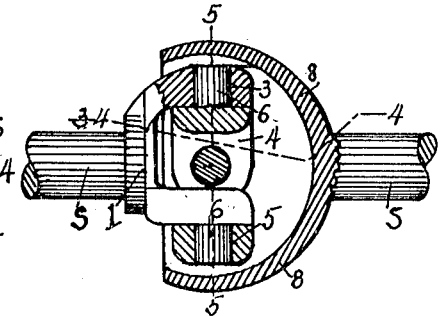
Fig. 3 is a sectional view of the knuckle joint connected, with the cross pins and bearings on the same radial plane.
Figure 4:
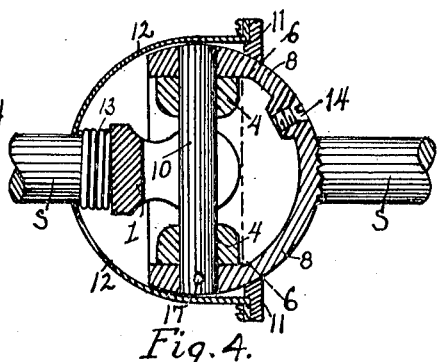
Fig. 4 is a horizontal section of Fig. 3 on the line 4—4 with inclosing lubricating and dirt proof chamber added.
Figure 6:
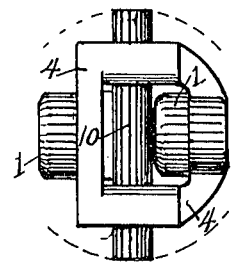
Fig. 6 is a side view of the journal ring on line 6—6 of Fig. 4.

It will be observed that the fork 8 in Figs. 3 and 4 is of a globular bell-shaped form about which is smoothly fitted an annular collar 11 to which is attached a semispherical casing 12 inclosing the opposite fork 1. A spiral spring 13 about the shaft S between the shoulder of fork 1 and casing 12 holds collar 11 closely fitted to the globular fork 8. The inclosure thus made by the globular form 8 and the semispherical casing 12, as shown in Fig. 4, forms an inclosure about the knuckle joint to be filled with a suitable lubricant through the screw hole opening 14. By means of the inclosure or lubricant chamber, the knuckle joint is made self lubricating and dirt proof. The exterior parts of the knuckle joint chamber being spherical and smooth makes a knuckle joint that can be used with safety in exposed places.

It is to be observed that the form of the fork and journal ring is such that the knuckle joint will allow the shaft S to swing approximately 30 degrees from its alinement and will work freely and easily.

It is to be further observed that the cross pin 10 fits so closely to the stem member of the fork 1 that the stem and socket bearings of fork 1 are securely held in and on their respective bearings of ring 4. The stem and socket bearings being in the same radial plane with cross pin 10 gives the greatest freedom to the working of the knuckle joint.

Figure 1:
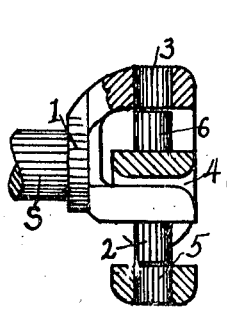
Figure 1 is a side view of one fork of my improved knuckle joint with the journal block or ring shown in section, said fork having stem and socket bearings to be inserted in and on similar bearing of the said ring.
Figure 7:
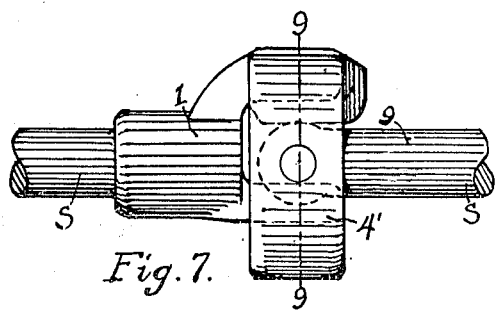
Fig. 7 is a side view of a modified form of the knuckle joint.
Figure 9:
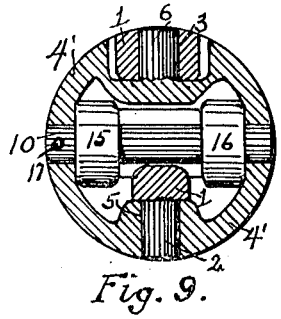
Fig. 9 is a cross section of Fig. 7 on line 9—9, showing the construction of the round journal ring.
Figure 8:
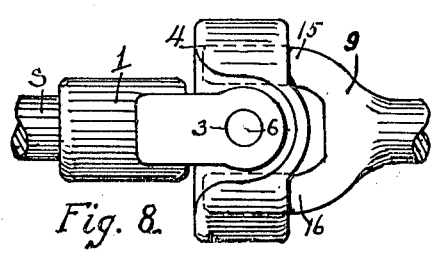
Fig. 8 is a top view of Fig. 7.

The construction for a modified form open knuckle joint is similar to the joint heretofore described and is illustrated by Figs. 7, 8 and 9. The fork 1' is practically the same as in Fig. 1, the journal ring 4' has a smooth circular perimeter and the opposite fork 9 is made with two members 15 and 16 to slip inside of ring 4' to receive pin 10 with ends flush with the exterior surface of ring 4'. This provides a practically smooth round knuckle joint that can be operated with safety in exposed places.

Having thus described my invention I claim:—

1. A universal joint or shaft coupling comprising a fork having a socket in one member thereof and a stem projecting from the opposite member of the fork, a ring coöperatively associated with the fork and formed with a stem to enter the socket of the fork member and with a socket to receive the stem of the other member of the fork, a yoke having portions lapping the ring, and a coupling pin uniting the ring, and the yoke.

2. A universal joint or shaft coupling comprising a fork having a socket in one member thereof and a stem projecting from the opposite member of the fork, a ring coöperatively associated with the fork and formed with a stem to enter the socket of the fork member and with a socket to receive the stem of the other member of the fork, a yoke cup-shaped in form and having contained therein the fork and the ring, a coupling pin uniting the ring, and the yoke, and a cup-shaped casing having a free connection with the yoke, said casing and yoke forming a housing and lubricating chamber for the inclosed members of the coupling.

3. A universal joint or shaft coupling comprising a fork having a socket in one member thereof and a stem projecting from the opposite member of the fork, a ring coöperatively associated with the fork and formed with a stem to enter the socket of the fork member and with a socket to receive the stem of the other member of the fork, a yoke cup-shaped in form and having contained therein the fork and the ring, a coupling pin uniting the members of the ring, and the yoke, a collar mounted on the yoke, a cup-shaped casing connected to said collar, and a spring acting on the cup-shaped casing to hold said casing and collar and the yoke together under spring tension.

4. A universal joint or shaft coupling comprising a fork having a socket in one member thereof and a stem projecting from the opposite member of the fork, a ring coöperatively associated with the fork and formed with a stem to enter the socket of the fork member and with a socket to receive the stem of the other member of the fork, a yoke and a coupling pin connecting the yoke to the ring.

OLE O. STORLE.

Copies of this patent may be obtained for five cents each, by addressing the "Commissioner of Patents, Washington, D. C."